Nov. 14, 1961     D. W. WEISS     3,008,516

PRESSURE SENSITIVE CONTROL DEVICE

Filed June 25, 1958

INVENTOR.
David William Weiss

BY

ATTORNEYS

3,008,516
PRESSURE SENSITIVE CONTROL DEVICE
David William Weiss, East Islip, N.Y., assignor to Fairchild Stratos Corporation, a corporation of Maryland
Filed June 25, 1958, Ser. No. 744,422
13 Claims. (Cl. 158—42.1)

This invention relates to a pressure sensitive control device which operates in response to a pressure above a predetermined level and/or a pressure below a predetermined level to produce a desired control function.

Although the control device of the present invention has a wide range of application, it is particularly suited to serve as a sensing device for a combustion chamber to provide a signal when the pressure exceeds a prescribed maximum value or falls below a prescribed minimum value.

Figure 1:
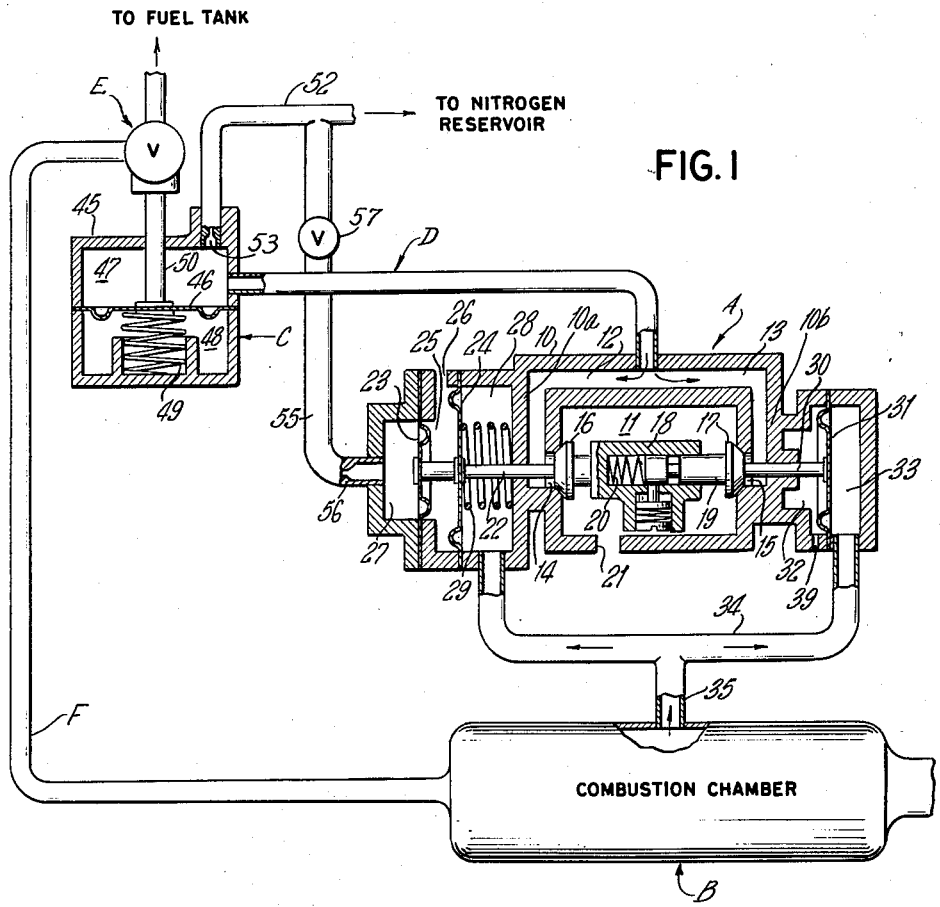
Figure 2:
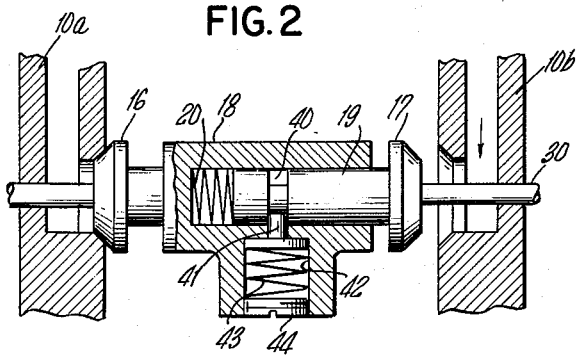

For a more complete understanding of the present invention, reference may be made to the detailed description which follows and to the accompanying drawings in which:

FIGURE 1 is a schematic representation of a system embodying the present invention in which the control device is shown in cross-section; and FIGURE 2 is an enlarged fragmentary view of the control device with parts shown in a different position.

Referring to FIGURE 1, the control device A is utilized to detect the pressure in a combustion chamber B. If the pressure rises above a predetermined value, indicative of an unsafe condition, or if the pressure falls below a predetermined level, indicative of a flame-out condition, the control device provides a signal which is transmitted to an actuator C through a conduit D. The actuator C, in turn, functions to close a valve E in a fuel line F which supplies fuel to the combustion chamber.

The control device A comprises a housing 10 having a chamber 11 therein. A pair of passages 12 and 13 are defined within the housing. The passage 12 connects the conduit D with the chamber 11 through a port 14. The passage 13 connects the conduit D with the chamber 11 through a port 15. The chamber 11 is vented through an opening 21.

A pair of relatively movable valves 16 and 17 are accommodated within the chamber 11. The valve 16 is formed with a barrel 18 having a bore therein in which the shank 19 of the valve 17 is guided. A compression spring 20 is accommodated within this bore. The spring acts against both valves to move them apart, thereby urging them to closed positions against their respective valve seats; that is to say, the valve 16 is urged to close the port 14 and the valve 17 is urged to close the port 15.

The valve 16 is provided with an extension shaft or stem 22 which is guided for axial movement in the wall 10a of the housing. Movable diaphragms 23 and 24 are affixed to the extension shaft 22. A chamber 25 vented to atmosphere through an opening 26 is defined between the diaphragms 23 and 24. Chambers 27 and 28 are defined on opposite sides of the diaphragms 23 and 24, respectively. A compression spring 29 is accommodated in the chamber 28.

The valve 17 is provided with an extension shaft 30 which is guided for axial movement in the wall 10b of the housing. A movable diaphragm 31 is affixed to the extension shaft 30. The diaphragm 31 separates the chambers 32 and 33. The chamber 32 is vented to atmosphere through the opening 39.

The chambers 28 and 33 are connected by a conduit 34, which conduit 34 is connected to the combustion chamber B through a conduit 35. Thus, the pressure in the combustion chamber is transmitted to both the chambers 28 and 33.

Although the spring 20 urges the valves 16 and 17 apart, if either is moved toward the other, or if both are moved toward each other, a spring detent is provided for locking them together so that at least one of the valves thereafter remains open. This is accomplished by forming the shank 19 with a circumferential groove 40 which is adapted to be engaged by a spring urged locking pin 41. This condition is illustrated in FIGURE 2 of the drawings. The pin 41 is accommodated in a radial bore 42 in the barrel 18. The bore 42 contains a compressed spring 43 which is retained therein by a threaded plug 44. In the normal operating positions of the valves 16 and 17, shown in FIGURE 1, the groove is offset from the spring urged pin 41. However, when one or both of the valves is opened, the relative movement of the valves brings the groove and spring urged pin into alignment and the pin drops into the groove and locks them in this relative position until the pin is manually reset.

The actuator C comprises a housing 45 having a movable diaphragm 46 therein which separates the interior of the housing into upper and lower chambers 47 and 48, respectively. A valve stem 50 which is axially movable in the housing 45 is connected to the diaphragm 46. The lower chamber 48 contains a compressed spring 49 which acts upwardly on the diaphragm to maintain the valve E closed. However, the upper chamber 47 is in communication with a source of fluid under pressure, preferably a non-combustible fluid, such as nitrogen, via a conduit 52 containing a restrictor 53. When the valves 16 and 17 are closed, pressure is permitted to build up in the conduit D and hence also in the chamber 47 to compress the spring 49 and maintain the valve E open. When the fluid in conduit D and the chamber 47 is vented by reason of the opening of either or both of the valves 16 and 17, the pressure in the chamber 47 drops, permitting the spring 49 to close the fuel valve E.

Turning now to the operation of the system, fuel is delivered to the combustion chamber B through the valve E and the conduit F. When the combustion chamber is operating within its safe limits, pressure transmitted from the combustion chamber to the chamber 28 acts upon the diaphragm 24 to maintain the valve 16 in closed position. Also, pressure transmitted from the combustion chamber to the chamber 33 acts upon the diaphragm 31 to urge the valve 17 toward open position, but this movement is restricted by the action of the spring 20 which normally maintains the valve 17 closed.

The valve 16 is urged to open position by the action of fluid in the chamber 27 against the diaphragm 23. The chamber 27 is connected to the source of nitrogen under pressure through the conduit 55 which contains a restrictor 56 therein. The pressure of the fluid in the chamber 27 is counterbalanced to some degree by the spring 29 in the chamber 28. The valve 16 is maintained in closed position when the combined effects of the spring 29 and the pressure in the chamber 28 acting on the diaphragm 24 are sufficient to overcome the force exerted on the diaphragm 23 from the chamber 27.

When both valves 16 and 17 are closed, pressure builds up in the chamber 47 to maintain the fuel valve E open.

If the pressure in the combustion chamber rises above a predetermined value, the pressure acting on the diaphragm 31 from the chamber 33 will overcome the action of the spring 20, whereby moving the valve 17 to open position. When it is displaced far enough to permit the groove 40 to come into alignment with the locking pin 41, the locking pin will engage the groove and prevent the valve 17 from again seating. While the valve 17 is open, fluid escapes from the chamber 47 through the conduit D and the passage 13, passing into the chamber 11 through the open valve 17, from which it is vented through the opening 21. If the pressure in the combustion chamber falls below a predetermined value, the pressure acting upon the diaphragm 24 from the chamber 28 will fall, permitting the pressure in the chamber 27 acting against the diaphragm 23 to exert an opening force on the valve 16.

Thus, when the pressure in the combustion chamber B exceeds a prescribed level, the valve 17 is opened, and when the pressure in the combustion chamber falls below a prescribed level, the valve 16 is opened. In either case, the nitrogen is vented from the chamber 47 of the actuator through the conduit D, the passages 12 or 13, the open valves 16 or 17, to the chamber 11 and thence through the vent 21 to atmosphere. The decrease in pressure in the chamber 47 permits the spring 49 to close the fuel valve E, cutting off the flow of fuel to the combustion chamber.

Because of the locking action of the spring detent 40, 41, one or both of the valves remain open until the supply of nitrogen is exhausted or until the valves are manually reset.

When the system is being put in operation and while pressure is building up in the combustion chamber, the nitrogen is slowly built up in the chamber 27 to prevent premature opening of the valve 16. Toward this end, the conduit 55 is provided with a valve 57 which permits the nitrogen to be delivered slowly to the chamber 27. The restrictor 56 also helps in slowing down the build-up of pressure in the chamber 27.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

I claim:

1. A pressure sensitive device comprising a housing, a pair of relatively movable valves, separate pressure controlled actuating means for controlling each of said valves, a source of control fluid under pressure, passage means connecting the source of control fluid with each of said valves, means connecting both of said actuating means with a source of fluid whose pressure is to be detected, the fluid the pressure of which is to be detected urging one of said valves through its corresponding actuating means to open position and the other of said valves through its corresponding actuating means to closed position, and means for urging to open position the valve which is urged to closed position by the fluid whose pressure is to be detected, whereby when the pressure of the fluid to be detected falls below a predetermined value or rises above a predetermined value, one of the valves will be opened, permitting a flow of the control fluid therethrough.

2. A pressure sensitive device as set forth in claim 1 including means for locking at least one of the valves in open position upon opening of either valve.

3. A pressure sensitive device as set forth in claim 1 in which the control fluid is influenced by the valves so as to be of one value when both valves are closed and another value when either valve is open, and including an actuator in communication with and regulated by the control fluid, the actuator being in one position when both of said valves are closed and in another position when either of said valves is open.

4. A pressure sensitive device comprising a housing, a chamber therein, ports at opposite ends of the chamber, passages communicating with the ports to conduct a fluid to the ports for flow into the chamber, a pair of valves accommodated within the chamber, a barrel connected to one of the valves, an extension connected to the other of the valves in telescoping relationship with said barrel, means urging both valves to closed positions across the ports, preventing flow through the ports, and pressure actuated means in communication with a source of pressure to be detected controlling said valves so that one of the valves will open in the event the pressure exceeds or falls below predetermined values.

5. A pressure sensitive device as set forth in claim 4 including spring detent means for locking the barrel and the extension together in a telescoped condition when one of the valves is opened, thereby preventing both valves from thereafter closing.

6. A pressure sensitive device as set forth in claim 4 in which the pressure actuated means includes a valve stem connected to each of the valves and extending outwardly of the chamber, movable diaphragms connected to the valve stems of each of the valves, and means defining a pressure chamber adjacent each of the diaphragms.

7. A pressure sensitive device comprising a housing having a chamber defined therein, ports at opposite ends of the chamber, passages communicating with each of the ports, a pair of relatively movable valves accommodated within the chamber, means urging the valves apart into closing position with the respective ports, an extension connected to each of the valves, each of the extensions extending outwardly of the chamber, at least two movable diaphragms connected to one of the extensions, a pressure chamber adjacent one of the diaphragms, a pressure chamber adjacent the other of the diaphragms, an intermediate chamber between the two diaphragms, means for venting the intermediate chamber, a passage connecting one of the pressure chambers with a control fluid, urging the respective valve toward open position, a passage connecting the other of the pressure chambers with a fluid whose pressure is to be detected, urging the respective valve to closed position when the pressure is above a predetermined value, at least one movable diaphragm connected to the other of the extensions, pressure chambers adjacent both sides of the movable diaphragm, means for venting one of the last mentioned chambers to atmosphere, a passage connecting the other of the last mentioned chambers with a fluid whose pressure is to be controlled, urging the respective valve to closed position when the pressure is below a predetermined value, and passages connecting each of the ports with a control fluid.

8. A pressure sensitive device as set forth in claim 7 including means connected to both of the valves, said means being relatively movable and in telescoping relationship.

9. A pressure sensitive device as set forth in claim 8 including a spring detent carried by the means connected to one valve and engageable with a recess carried by the means connected to the other valve for locking the valves in a telescoped condition, maintaining at least one of the valves open.

10. A system for producing a signal when a pressure to be detected falls below a predetermined value or rises above a different predetermined value comprising a source of control fluid under pressure, a signal-transmitting passage communicating with the control fluid, the elevated pressure in which is indicative of a detected pressure within the pre-established range and a reduced pressure in which is indicative of a detected pressure above or below the pre-established range, a pair of normally closed pressure actuated valves in communication with said signal-transmitting passage for influencing the pressure therein, pressure-actuated means for operating each of said valves, a passage connecting the pressure to be detected with pressure-actuated means for one of the pressure actuated valves, whereby an increase in the detected pressure above a given value is transmitted therethrough to open the respective valve, means urging the other valve to open position, and a passage connecting the pressure to be detected with the pressure-actuated means for the other of the pressure actuated valve, whereby a detected pressure above a given level maintains the respective valve closed, permitting the valve to open when the pressure falls below a given value, the opening of either valve exhausting the control fluid and causing a decrease in pressure in the signal-transmitting passage.

11. A combustion apparatus comprising a combustion chamber, a fuel valve through which fuel is supplied to the combustion chamber, an actuator for controlling the operation of the fuel valve, a source of control fluid for operating the actuator, a passage connecting the actuator with the control fluid, a passage for exhausting the control fluid, a valve in communication with said exhaust passage which when closed permits the control fluid to be transmitted to the actuator to build up the pressure therein and when open prevents the control fluid from being transmitted to the actuator, means for urging the valve to open position, and actuating means for the valve in communication with the pressure in the combustion chamber to maintain the valve closed when the pressure in the combustion chamber exceeds a predetermined value, and for permitting the valve to open when the pressure falls below a predetermined value, the opening of the valve exhausting the control fluid and causing the actuator to close the fuel valve.

12. A control device as set forth in claim 11 including means for cutting off the flow of fluid to the combustion chamber when the pressure in the combustion chamber exceeds a predetermined value, said means including a second valve through which control fluid may be exhausted and actuating means for the second valve in communication with the pressure in the combustion chamber to maintain the second valve closed when the pressure in the combustion chamber falls below a predetermined value.

13. A system for producing a signal when a pressure to be detected falls below a predetermined value or rises above a different predetermined value comprising a signal-transmitting passage in communication with a control fluid, a pair of pressure-actuated valves in communication with said signal-transmitting passage, each capable of regulating the pressure therein, pressure-actuated means in communication with the pressure to be detected for controlling one of the valves in response to a pressure below a predetermined value, pressure-actuated means in communication with the pressure to be detected for controlling the other of the valves in response to a pressure above a predetermined value, guide means connecting the valves for relative movement, and means for locking the valves in fixed relative positions upon actuation of either valve by its respective pressure-actuated means.

References Cited in the file of this patent

UNITED STATES PATENTS

| | | |
|---|---|---|
| 397,672 | Tonge | Feb. 12, 1889 |
| 640,222 | Price | Jan. 2, 1900 |
| 843,093 | Nash | Feb. 5, 1907 |
| 1,232,481 | Bertsch | July 10, 1917 |
| 2,138,988 | Thomas | Dec. 6, 1938 |
| 2,295,728 | Gess | Sept. 15, 1942 |
| 2,620,820 | Born | Dec. 9, 1952 |
| 2,679,261 | Otis | May 25, 1954 |

FOREIGN PATENTS

| | | |
|---|---|---|
| 159,517 | Australia | Oct. 28, 1954 |